United States Patent [19]

Johnston

[11] 4,011,063

[45] Mar. 8, 1977

[54] LOW DENSITY ABRASIVE UTILIZING ISOCYANURATE RESIN

[75] Inventor: Manley R. Johnston, St. Paul, Minn.

[73] Assignee: Minnesota Mining and Manufacturing Company, St. Paul, Minn.

[22] Filed: Apr. 5, 1972

[21] Appl. No.: 241,449

[52] U.S. Cl. .................................. 51/295; 51/296; 51/297; 51/298 A

[51] Int. Cl.² .................... B21B 21/00; B24D 3/32

[58] Field of Search ............. 51/295, 296, 298, 297

[56] References Cited

UNITED STATES PATENTS

| | | | |
|---|---|---|---|
| 2,958,593 | 11/1960 | Hoover et al. | 51/295 |
| 3,020,139 | 2/1962 | Camp et al. | 51/295 |
| 3,071,554 | 1/1963 | Scott et al. | 51/298 |
| 3,301,644 | 1/1967 | Habib | 51/295 |
| 3,378,398 | 4/1968 | Nottebohm et al. | 51/294 |
| 3,510,283 | 5/1970 | McGurran | 51/295 |
| 3,529,945 | 9/1970 | Charvat | 51/295 |

*Primary Examiner*—Donald J. Arnold
*Attorney, Agent, or Firm*—Alexander, Sell, Steldt & Delahunt

[57] ABSTRACT

An improved low-density abrasive of the type wherein abrasive granules are bonded throughout a lofty, porous, compressible, non-woven fibrous web, the fibers bonded to each other and the abrasive granules bonded to the webs by a resin or the fibers of the web being bonded to each other by a first resin and the abrasive granules bonded to the web by a second resin. At least one of the resins employed in the present product is a hard, tough, polyisocyanurate resin having a minimum of 0.5 gram equivalent of isocyanurate per thousand grams of resin, the sum of the urethane plus isocyanurate equivalents being at least 1.3. The resulting product is useful for a wide spectrum of industrial and home abrasives applications.

13 Claims, No Drawings

LOW DENSITY ABRASIVE UTILIZING ISOCYANURATE RESIN

BACKGROUND OF THE INVENTION

Hoover et al., U.S. Pat. No. 2,958,593 describes and claims a low-density abrasive article comprising a uniform, lofty, open, non-woven, three-dimensional integral structure formed of many interlaced, randomly extended, flexible, durable, tough, resilient, organic fibers. The structure is unified throughout by firmly bonding fibers together at points where they cross and contact. Abrasive particles are distributed within the structure and firmly bonded to the fibers by an adhesive, which may perform the dual function of bonding web fibers together and bonding abrasive grains thereto. Alternatively, a first adhesive may be used for bonding the fibers to each other and a second adhesive for bonding the abrasive granules to the fibers. Despite great utility and broad commercial acceptance, most low density abrasive products heretofore known are subject to tearing when the abrasive is snagged on a burr or other projection, largely because of the hard, brittle nature of the phenolic resins generally used in making low density abrasives. Plasticizing a phenolic resin binder will lower its hardness and improve the tear resistance of a low density product made therewith, but as tear resistance increases, abrading effectiveness tends to decrease. Further, the phenolic systems not only have a tendency to degrade and weaken nylon fibers, but also show poor adhesion to polyester fibers, thereby limiting the potential of low density abrasives made from said phenolic systems using these resins.

Low density abrasive webs bonded with epoxy resins have excellent tear resistance, but commonly used, the cured resins do not have adequate heat-resistance for severe abrasive application. In addition, catalyzed epoxy resins often have an excessively short pot life, making it commercially difficult to bond the fibers of a low density abrasive with an epoxy resin. Epoxy novolac systems as disclosed and claimed in U.S. Pat. No. 3,510,283 have lower toxicity and better durability than other epoxy systems, but low density abrasive products bonded with the epoxy-novolacs tend to deposit melted fibers (known as smear) on the workpiece when exposed to the high stresses common in abrasive uses.

Another type of low density abrasive utilizes a flexible elastomeric binder, such as latex or a reclaimed rubber dispersion. The use of such binders gives a product which is useful in making scouring pads for hand use, but does not result in a low density abrasive useful in a wide variety of industrial applications where a hard binder is necessary to prevent smearing and maintain sufficient cut.

Prior to the present invention, the men skilled in the low density abrasive art faced a dilemma - either their products abraded well without smearing but tended to snag and tear, or they resisted tearing but abraded poorly and/or smeared.

SUMMARY OF THE INVENTION

The low density abrasives made in accordance with this invention are structurally similar to products described in the Hoover et al. patent, but employ an isocyanurate resin. Low density abrasives where the fibers are bonded to each other by a first resin and the abrasive granules are bonded to the structure by a second resin, at least one of the resins being an isocyanurate resin, are characterized by the same excellent conformability and abrading characteristics as the conventional products, but they possess significantly greater toughness and tear resistance than conventional products. The low density abrasives of this invention have the additional desirable properties of bonding firmly to both polyester and nylon fibers without causing embrittlement or degradation.

Isocyanurate resins preferred in the practice of this invention are the product of the catalyzed trimerization of polyisocyanate-terminated polyols known in the art. The first step in the formation of an isocyanurate resin is either making an isocyanate-terminated prepolymer or mixing a polyhydroxyl compound with a stoichiometric excess of an organic polyisocyanate to form a potentially reactive solution. When a prepolymer is catalyzed, the free isocyanate groups trimerize forming an isocyanurate resin. When a reactive solution is formed, essentially all of the OH groups of the polyol react with isocyanate to form urethane linkages, after which trimerization of the remaining unreacted isocyanate groups takes place.

Among those polyisocyanates which can be used in the preparation of isocyanurate resins capable of making the low-density abrasive of this invention are tolylenediisocyanate and polymethylene polyphenyl isocyanate, as well as mixtures of these and other polyisocyanate compounds. An excellent list of commercially available, useful polyisocyanates is found in *Encyclopedia of Chemical Technology*, Kirk & Othmer, Vol. 12, pp. 46–47, Interscience Pub., 1967; and in Appendix A of *Polyurethanes: Chemistry and Technology*, by Saunders & Frisch, Part I, Interscience Pub. (New York, 1962).

A cured isocyanurate resin used in forming low density abrasive products must have a minimum hardness of at least 50 on the Shore D scale inorder to maintain the necessary abrasive action. Those isocyanate-terminated prepolymers or polyisocyanate-polyhydroxyl systems which when cured yield, per 1000 grams of resin, at least 0.5 gram equivalent of isocyanurate and a combined total of at least 1.3 gram equivalents of urethane plus isocyanurate, result in a resin having the necessary hardness to perform adequately under the abrasive conditions encountered by low density abrasive products. The preferred resins are those falling within the Shore D hardnesses range of 65–95.

The presently preferred isocyanurate resin is based on a prepolymer formed from polymethylene polyphenyl isocyanate (e.g., Mondur MRS), and polyoxypropylene glycol having a hydroxyl equivalent weight of about 385 (e.g., Pluracol P-710) heated to react all the hydroxyl with isocyanate, two hours at about 80° C. being sufficient in most cases. After the reaction is complete and all the hydroxyl groups have reacted with the isocyanate to form an isocyanate-terminated prepolymer containing urethane linkages, an acceptably hard isocyanurate resin can be formed by any of several catalysts, such as borate esters, tertiary amines, or xanthates, which trimerize the remaining isocyanate to isocyanurate. An excellent reference on useful catalysts for promoting the formation of isocyanurate resins is Saunders & Frisch (supra).

Also known as a catalyst which promotes trimerization of isocyanate is a carbamic acid ester (urethane) in combination with a tertiary amine, as disclosed in U.S.

Pat. No. 2,954,365. I have found that a trimerized isocyanurate resin, formed by the reaction of aromatic isocyanate-terminated prepolymers, catalyzed by a combination of N,N-dialkylalkanolamines, said tertiary amines having the structure HO—R″—N(R)$_2$ where R″ is lower alkylene having 2—4 carbon atoms and R is lower alkyl having 1–4 and preferably 1–2 carbon atoms, (e.g. N,N-dimethylethanolamine) and an epoxy is a particularly valuable resin for making low density abrasives.

of resin, and the hardness of various resin formulations are summarized in Table I.

TABLE I

| Resin Formulation | PARTS BY WEIGHT | | | | | | | | | | | | Eq. Wts./1000 g. resin | | Shore D Hardness |
|---|---|---|---|---|---|---|---|---|---|---|---|---|---|---|---|
| | Polyisocyanate | | | Polyol | | | | | | Catalyst | | | | | |
| | a | b | c | d | e | f | g | h | j | k | l | m | Urethane | Isocyanurate | |
| 1 | 98 | | | | | | | | | | | 2 | 0.22 | 2.39 | 92 |
| 2 | 98 | | | | | | | | | 1 | 1 | | 0.11 | 2.42 | 92 |
| 3 | 78.4 | | 19.6 | | | | | | 2 | | | | 0.67 | 1.74 | 90 |
| 4 | | 69.3 | | | | | | 29.7 | 1 | | | | 0.23 | 2.57 | 79 |
| 5 | 68.6 | | | | 23.5 | 5.9 | | | 2 | | | | 1.05 | 1.37 | 80 |
| 6 | 78.4 | | | 19.6 | | | | | 2 | | | | 0.74 | 1.71 | 75 |
| 7 | 49 | | | 49 | | | | | 2 | | | | 0.65 | 1.01 | 67 |
| 8 | 58.8 | | | | | | | 39.2 | 2 | | | | 0.36 | 1.35 | 82 |
| 9 | 39.2 | | | 58.8 | | | | | 2 | | | | 0.75 | 0.73 | 60 |
| 10 | 44.1 | | 53.9 | | | | | | 2 | | | | 1.56 | 0.59 | 70 |
| 11 | 68.6 | | | | 23.5 | 5.9 | | | | | 2 | | 0.89 | 1.42 | 80 | a) polymethylene polyphenyl isocyanate having an equivalent weight of about 133, available as "Mondur MRS" from Mobay Chemical Company
b) 80/20 2,4-2,6-tolylene diisocyanate
c) polyoxypropyleneglycol having an equivalent weight of about 385, available as "Pluracol" P710 from the Wyandotte Chemical Company
d) polyoxypropylene glycol having an equivalent weight of about 1,000 available as "Niax" polyol PPG2025 from Union Carbide
e) polyester polyol having an equivalent weight of about 335, available as "Multron" R-12, from Mobay Chemical Company
f) polyoxypropylene triol, equivalent weight about 500, available as "Pluracol TP1540" from Wyandotte Chemical Company
g) polyoxypropylene triol, equivalent weight about 140, available as "Pluracol TP440" from Wyandotte Chemical Company
h) polyoxypropylene glycol, equivalent weight about 2,000, available as "Niax" polyol PPG4025 from Union Carbide.
j) monosodium xanthate of dipropylene glycol dissolved in dipropylene glycol, having an OH equivalent weight of about 125.
k) 2,2[bis 4-(2′3′ epoxy propoxy)phenol]propane, diglycidyl ether of bis phenol A
l) sodium hexyl carbitol-trihexyleneglycol biborate ester
m) N,N-dimethylethanolamine The isocyanurate resins catalyzed by said aminee-poxy catalyst systems have the desirable characteristic of good stability at ambient room temperature for up to a month; yet they cure quickly and completely in ten minutes to an hour at elevated temperatures approaching 135° C.

DESCRIPTION OF THE PREFERRED EMBODIMENT

The invention is further described by the aid of illustrative examples in which all parts are by weight unless otherwise noted. It is to be understood, however, that specific amounts and conditions cited in these examples should not be construed to limit the scope of applicant's invention. Coating weights in the examples are given in grains per 24 square inches of web face.

EXAMPLE 1

Several systems which produce acceptable isocyanurate resins useful for making a low density abrasive product of this invention were formulated using various polyols and polyisocyanates. To form the resins of this example, the reactants and catalysts were mixed in a laboratory air stirrer for one minute, degassed under a reduced pressure of 10 millimeters Hg for 10 minutes and cured at 100° C. for one hour. The isocyanurate and urethane gram equivalents were calculated by assuming all hydroxyl groups reacted with isocyanate and all excess isocyanate was trimerized. Some of the resins were analyzed using infrared absorption to determine that no free isocyanate was present in the cured resins, confirming the correctness of the assumptions.

The gram equivalent weights of urethane and gram equivalent weights of isocyanurate per thousand grams

EXAMPLE 2

A low density non-woven web about ⅝ inch thick weighing 60 grains per 24 square inches was formed from 60 denier crimpset nylon fibers on a Rando Webber machine. The resulting web was needle tacked into 36 grains of 6,6 nylon scrim having 6 threads per inch in both the warp and fill directions (available from Burlington Industries as 61501/16/70) using a James Hunter Model 9-needle loom, forming a low density web weighing 96 grains per 24 square inches.

The resulting low density web was roll coat-prebonded using about 130 dry grains of a solution comprising 210 parts polyester diol having a hydroxy equivalent weight of 1150 (Multron R-68, available from Mobay Chemical Co.), 4.07 parts glycerol, 4.07 parts trimethylol propane, 210 parts of a 75 percent solids solution in ethylacetate of the reaction product of three moles of tolylene diisocyanate per one mole of trimethylol propane (available as Mondur CB75 from Mobay Chemical Co.), 10 parts of red pigment (Setacyl Red R available from Geigy Chemical Co.) and 31.0 parts of 1-acetoxy-2-ethoxyethane. The resin was cured to a non-tacky condition by passing the coated web through a 90-foot convection oven maintained at about 170° C. at a rate of approximately 12 feet per minute.

An isocyanate-terminated urethane prepolymer similar to formulation 3 of Example I was catalyzed by one part of N,N-dimethylethanolamine and oné part of the diglycidyl ether of bisphenol A per 98 parts prepolymer to make an isocyanurate resin. The dried web was sprayed on the side opposite the nylon scrim with a slurry make coat comprising 3,000 parts grade 100-150 aluminum oxide, 1,000 parts of the isocyanurate resin, one part Setacyl Red R red pigment and 100 parts 1-acetoxy-2-ethoxyethane, such that a total of 225 dry grains of slurry per 24 square inches was applied. The resin on the web was cured by passing the web through a 180 foot convenction oven having a temperature of 160° C. at 12 feet per minute.

The resulting low density abrasive which was about 0.33 inch thick was slit to 3-inch widths and cut to 132-inch lengths. The ends of the resulting strip were ground to reduce their thickness and the ends adhesively joined using a 45° angle overlap splice forming an endless belt.

The endless belt was placed on a 14-inch diameter contact wheel mounted 51 inches (center-to-center) away from a 9-inch diameter idler roller. The contact wheel was driven at 1750 rpm while a ½-inch diameter by 6-inch long steel bar, positioned parallel to the axis of the wheel and held firmly to prevent rotation was pushed against the belt with a total force of 30 pounds.

The steel rod and belt were weighed at one minute intervals to determine both incremental and cumulative cut and belt weight loss. The belt of this example removed 282 grams of steel in 18 minutes and lost 149 grams. Grain efficiency, the ratio of stock removed over belt weight loss was 282/149=1.89. The ratio of stock removed on the last cycle to that removed on the first cycle, retention of cut, was 71.2 percent.

A control belt was made substituting base-catalyzed phenol-formaldehyde resin in the slurry make coat. The phenol-formaldehyde was applied by spraying as described above and subjecting the web to a curing step in a manner similar to that disclosed in U.S. Pat. No. 2,958,593, particularly Example 3. This belt cut 226 grams in 18 minutes and lost 245 grams for a grain efficiency of 0.92, and the retention of cut was 46 percent. Phenol-formaldehyde is the standard resin presently used in low density abrasive articles.

EXAMPLE 3

A low density, non-woven web about ⅝ inch thick and weighing about 96 grains per 24 square inches was formed as described in the first paragraph of Example 2. The web was prebonded with a solution comprised of 200 parts of isocyanurate precursor as prepared in Example 2; one part Graysol Red pigment available from Geigy Chemical Company; and 2 parts 1-acetoxy-2-ethoxyethane, such that 130 dry grains of resin was applied to the web. The resin was cured as described in Example 2 and sprayed with the abrasive slurry make coat of Example 2 using the procedures hereinbefore described.

The resulting low density abrasive which was about 0.33 inch thick, was then slit to 3-inch widths, cut to 132-inch lengths and converted into endless belts, using an overlap splice.

The belt was mounted upon a 90 durometer 14inch diameter contact wheel and driven at 1,750 rpm while a ½ inch diameter by 6-inch long cold rolled steel rod was positioned parallel to the axis of the contact wheel and forced against the belt under a total force of 21 pounds. The rod and belt were weighed at two minute intervals to determine the cut and total belt weight loss. The belt made in this example cut a total of 184 grams in 30 minutes, while losing a total of only 32 grams, corresponding to a grain efficiency of 5.75. A comparable belt prebonded with a urethane-polyester resin and sprayed with a phenolic abrasive slurry make coat, cut a total of 264 grams in 30 minutes but lost 235 grams representing a grain efficiency of 1.12.

EXAMPLE 4

A low density non-woven web about ½-inch thick weighing 26 grains per 24 square inches was formed from 15 denier crimpset nylon fibers and prebonded with 32 dry grains per 24 square inches of a solution comprising 30.6 parts of the Mondur MRS isocyanurate precursor described in Example 2, 0.02 part of dimethyl silicone defoaming fluid, (Dow Antifoam A available from Dow Corning Chemical Company) and 6 parts of 1-acetoxy-2-ethoxyethane. The web was cured to a non-tacky state as in Example 1 and sprayed on one side with a slurry comprising 55.8 parts of grade 150/240 silicon carbide, 34.1 parts of base-catalyzed phenol-formaldehyde resin, 0.1 part black pigment, using 20.7 parts water, 1.8 parts isopropyl alcohol and 10.7 parts 2-ethoxyethanol as solvents. The web was sprayed with a total weight of 64 dry grains of the slurry per 24 square inches of web. The web was placed in a 155° C. oven for 6 minutes to cure the resin to a nontacky state, and then inverted and sprayed with the same slurry on the opposite side so that an additional 64 dry grains of slurry was applied. The resins were then cured at 155° C. to form a unified low density abrasive product about ⅜ inch thick.

The low density, non-woven abrasive of this example had machine and cross-directional tensile strengths respectively of 13.5 pounds and 13.1 pounds per inch of width compared to 11.6 and 11.5 pounds per inch of width for comparable low density abrasive webs with a plasticized phenol-formaldehyde prebond resin.

The low density abrasive of this example was further tested on a rotating test to measure resistance to tearing. A 16-inch diameter disk of low density abrasive was attached to the lower surface of a 16-inch motor driven disk weighted to a pressure of 0.4 lb. per square inch and rotated at 175 rpm. The rotating abrasive was placed against a 48-inch diameter table to which were radially attached five strips of abrasive sheet material (¾-inch by 24-inch, medium grade, Safety Walk non-slip material). The table was rotated at 21 rpm in the direction opposite that of the disk and the rotating disk was oscillated from the edge to the center of the table and back at the rate of 12 oscillations per minute until the pad failed by wearing through in one or more places.

Two webs using the isocyanurate prebond resin survived the rotating table test for an average of 7.6 minutes while comparable pads made with plasticized phenolformaldehyde prebonded material lasted for an average of only 3.9 minutes.

EXAMPLE 5

The web of Example 4 after prebonding was sprayed with a slurry comprising 48 parts of grade 240–360 silicon carbide and 30.6 parts of the isocyanurate precursor described in Example 2 dissolved in 1-acetoxy-2-ethoxyethane to a viscosity of 1,000 cps. A total of 64 grains of slurry per 24 square inches were applied and the resin cured at about 155° C. for 6 minutes to a tack-free condition. The web was then inverted and sprayed on the opposite side, applying an additional 63 dry grains of solids per 24 square inches, and the resin cured at 155° C. for 6 minutes to form a unified low density abrasive product about ⅜-inch thick.

The low density abrasive of this example was cut into 16-inch circular disks and subjected to the rotating table test, lasting an average of 20.2 minutes. This compares to two standard phenolic bonded, low density abrasive pads which survived for an average of 3.9 minutes.

Example 6

A low density, non-woven web weighing 21 grains per 24 square inches was formed for 15 denier crimpset nylon fibers on a Rando Webber and prebonded with three dry grains of a resin comprising 100 parts ethyl-methyl ketoxime blocked urethane having a prepolymer equivalent weight of about 750 (available as Adiprene BL-16 from E.I. duPont) and 47.0 parts of a 25 percent solution of methylene dianiline in 1-acetoxy-2-ethoxyethane, 2.24 parts of a 50 percent lithium stearate slurry in 1-acetoxy-2-ethoxyethane, 44.5 parts of 1-acetoxy-2-ethoxyethane and 240 parts xylene. The web was placed in a warm oven at about 150° C. for approximately 10 minutes and cured to a non-tacky state. The resulting web was dipped in a solution comprising 204 parts of the isocyanurate precursor described in Example 2, 200 parts 1-acetoxy-2-ethoxyethane and 10 parts of thixotropic agent (Thixin E, available from Baker Castor oil Company) dissolved in xylene, such that 8 dry grains of the resin was added. The web was then sprayed with 160 grains of grade 120 aluminum oxide before the resin was cured, and the total web cured in a warm oven at 150° C. for 3 minutes to a dry non-tacky state.

The mineral coated web was dipped into a resin solution comprising 11.8 parts 1-acetoxy-2-ethoxyethane, 36.7 parts of an ethyl-methyl ketoxime blocked urethane prepolymer, (Adiprene L-315, available from E.I. duPont), 27.5 parts of a 25 percent solution of methylene dianiline in 1-acetoxy-2-ethoxyethane, 10.4 parts of a 50 percent solution of lithium stearate in 1-acetoxy-2-ethoxyethane, 44 parts calcium carbonate, and 56 parts xylene, and passed between squeeze rolls such that a total of 40 dry grains of slurry was added per 24 square inches. The solvent was removed by evaporation at room temperature and the wheels convolutely wound on 2-inch cores under different tensions, to form four buns of varying density and hardness, viz., (1) 7.02 grams/in.$^3$ (70.4 durometer), (2) 8.49 grams/in.$^3$ (80.1 durometer), (3) 9.16 grams/in.$^3$ (79.6 durometer), and (4) 10.58 grams/in.$^3$ (92.7 durometer). The buns were cured at about 135° C. for 1-5 hours, forming integral bonded products.

The resulting roll was cut into 2-inch widths are mounted on a 2-inch horizontal shaft to form wheels. An assembly of eleven 0.3-inch die rule steel blades, spaced parallel to each other at ½-inch intervals was positioned with the length of said blades parallel to the axis of the wheel. The blade assembly was oscillated vertically, at 7 cycles per minute, with a stroke of 4.5-inches and forced horizontally into the rotating wheel. A number of wheels were tested at various pressures and wheel diameter loss measured at 2-minute intervals. The diameter loss as a function of pressure was then calculated and compared with data for wheels having similar density and durometer prepared using a phenolic resin for the make coat. The wheels made from the two different resins were measured for cutting ability by mounting on horizontal shafts and driving them at 3770 surface feet per minute. A ½-inch diameter, 6-inch long cold rolled steel rod positioned parallel to the wheels axis was forced against the wheel under a force of 25 pounds and weighed at 3 minute intervals. The abrasive wheels proved equal in abrading ability but the wheels made from a web bonded with isocyanurate resin suffered a smaller diameter loss at equal loadings when compared to equivalent wheels formed from phenolic bonded webs. For example, under 9 pounds pressure, the 8.49 density isocyanurate wheel lost about 0.02-inch in diameter while a comparable 8.55 density phenolic wheel lost about 0.08-inch diameter.

EXAMPLE 7

A low density, ⅝-inch thick non-woven web weighing 26 grains per 24 square inches was formed from 50 denier crimpset polyester fiber on a Rando Webber and roll coat prebonded with 32 dry grains of a slurry comprised of 30.6 parts of the isocyanurate precursor described in Example 2, 30 parts of grade 280/finer aluminum oxide and 4 parts of 1-acetoxy-2-ethoxyethane.

The web was cured to a non-tacky state at about 155° C. for 6 minutes and one side sprayed with a slurry consisting of 30 parts of the isocyanurate precursor described in Example 2, 66 parts of the grade 150-240 silicon carbide, and 9 parts of 1-acetoxy-2-ethoxyethane such that 64 dry grains of slurry was applied to the lofty, non-woven web.

The web was then inverted and the opposite side sprayed with an additional 64 dry grains of slurry, and the resins then cured to form a unified, non-woven abrasive about 0.3-thick.

The resulting web was cut into 16-inch circular disks and subjected to the rotating table test described in Example 4. The two low density abrasive disks of this example survived the rotating table test for an average of 53 minutes. The aggressiveness of the product was further evaluated using the Schiefer cut test (Section No. 4.3.1.3, Fed. Specification OOPOO4OG, July 15, 1963) by rotating the face of a 4-inch diameter disk of abrasive material at 250 rpm against a ¼ inch thick, 4-inch diameter rotating polymethyl methacrylate (Acrylite) disk having a Rockwell M hardness of 100, with 5 pounds force applied to the web-disk interface. The polymethyl methacrylate disks were weighed at eight 1,000-cycle intervals to determine the cutting pattern. The product of this example cut a total of 3,175 grams in 8,000 cycles to yield an average cut of 0.397 gram per interval; the retention of cut of the last interval was 35.4 percent that of the first interval. This cut compared favorably to that of a similar nylon web bonded with a phenol-formaldehyde product, which cut a total of 2,644 grams in 8,000 cycles yielding an average cut of 0.330 gram per interval with a retention of cut of 33.5 percent. The rotating table test results of the polyester web bonded with isocyanurate resin product show remarkable superiority in wear characteristics.

No direct phenol-formaldehyde bonded polyester web control was made for this example, since the phenolic resin systems adherence to polyester results in a less desirable low density abrasive product. A web formed of nylon was chosen for comparison because it most nearly approximates the characteristics of the polyester web made in this example.

Since the Schiefer and rotating table tests measure the snag resistance and abrading ability of a low density abrasive these results are considered outstanding.

EXAMPLE 8

A low density, non-woven web weighing about 45 grains per 24 square inches was formed from 50 denier crimp set nylon fibers on a Rando Webber machine. The resulting lofty, open, non-woven web was roll coat prebonded on both sides with a solution comprising 306 parts of the isocyanate precursor described in Example 2, 300 parts of 1-acetoxy-2-ethoxyethane, and one part of red pigment (Graysol Red, available from Geigy Chemical Company), such that 30 dry grains of resin were applied. The web was cured to a non-tacky state by heating to approximately 150° C. for about 6 minutes.

The resulting web was then sprayed with a make coat slurry comprising 500 parts of the isocyanate-terminated prepolymer described in Example 2, 1,000 parts of Grade 100-150 aluminum oxide, 10 parts of red pigment (Graysol Red), diluted with sufficient 1-acetoxy-2-ethoxyethane to give a slurry having a viscosity of 500 centipoises. Eighty dry grains of the slurry was applied per 24 square inches of web and the web placed in a 150° C. oven for six minutes to cure the resin to a non-tacky state. The resulting web was converted into a flap brush. The low density web was formed into 3½ by 72 inch strips. About 140 of the strips were placed in a tray with the 3½-inch dimension vertical, said tray holding the strips firmly and the resulting block of strips compressed to about 17 inches and one edge of the compressed strips was coated with pressure sensitive tape. When the compressive force on the low density abrasive strips was released, the low density abrasive strips assumed an annular configuration with the tape of the radially inner end of the flaps. The resulting cylindrical configuration was fitted to 5-inch diameter paper core by treating the core and the pressure sensitive tape of the low density abrasive cylinder with a two-part epoxy resin and curing at room temperature for 16 hours.

The resulting flap brush can be cut into wheels having the desired width to form a finishing brush having pieces of low density abrasive which radiate from a paper core. The converted flap brush of this example imparted a scratch pattern on aluminum and steel similar to the pattern imparted by comparative low density flap brushes bonded with phenol-formaldehyde but the brush of this example deposited less smear on the work surface.

What is claimed is:

1. In a low-density abrasive product wherein abrasive granules are bonded throughout a lofty, porous, compressible, nonwoven fibrous structure having interconnected three-dimensionally extending voids which constitute the majority of the volume thereof, the fibers of said product being bonded to each other and the abrasive granules bonded to said fibers by resinous binder, the improvement which comprises using for said binder the hard, tough, organically substituted polyisocyanurate resin of a cured isocyanate-terminated polyol, said resin having at least 0.5 gram equivalent of isocyanurate and at least 1.3 gram equivalents of urethane and isocyanurate combined, whereby the resulting low-density abrasive has extended wear life and reduced tendency to smear compared to similar products bonded with phenolic resins.

2. The product of claim 1 where the isocyanurate formation is catalyzed by an N,N-dialkylalkanolamine and an epoxy co-catalyst.

3. The product of claim 2 where said N,N-dialkylalkanolamine is N,N-diemthylethanolamine.

4. The product of claim 1, where said polyisocyanurate resin is the reaction product of an NCO-terminated polyurethane prepolymer.

5. The product of claim 4, where said polyurethane prepolymer is the reaction product of a polyol and an aromatic polyisocyanate.

6. The product of claim 5, where said polyol is polyoxypropylene glycol and said polyisocyanate is a polymethylene polyphenyl isocyanate.

7. The product of claim 1, where said resin has a hardness of 65-95Shore D.

8. The product of claim 1 in the form of sheets.

9. The product of claim 1 in the form of convolutely wound wheels.

10. The product of claim 1 in the form of endless belts.

11. The product of claim 1 in the form of a flap brush.

12. The product of claim 1 in the form of a wheel comprising a plurality of laminated disks.

13. In a low-density abrasive product wherein abrasive granules are bonded throughout a lofty, porous compressible, nonwoven fibrous structure having interconnected three-dimensionally extending voids which constitute the majority of the volume thereof, the fibers of said product being bonded to each other by a first resinous binder and abrasive granules being bonded to said fibers by a second resinous binder, the improvement which comprises using as one of said binders a hard, tough, polyisocyanurate resin having at least (per thousand grams of resin) 0.5 gram equivalent of isocyanurate and at least 1.3 gram equivalents of urethane and polyisocyanurate combined whereby the resulting low density abrasive has extended wear life and reduced tendency to smear compared to similar products bonded with phenolic resins.

* * * * *